United States Patent Office 3,420,550
Patented Jan. 7, 1969

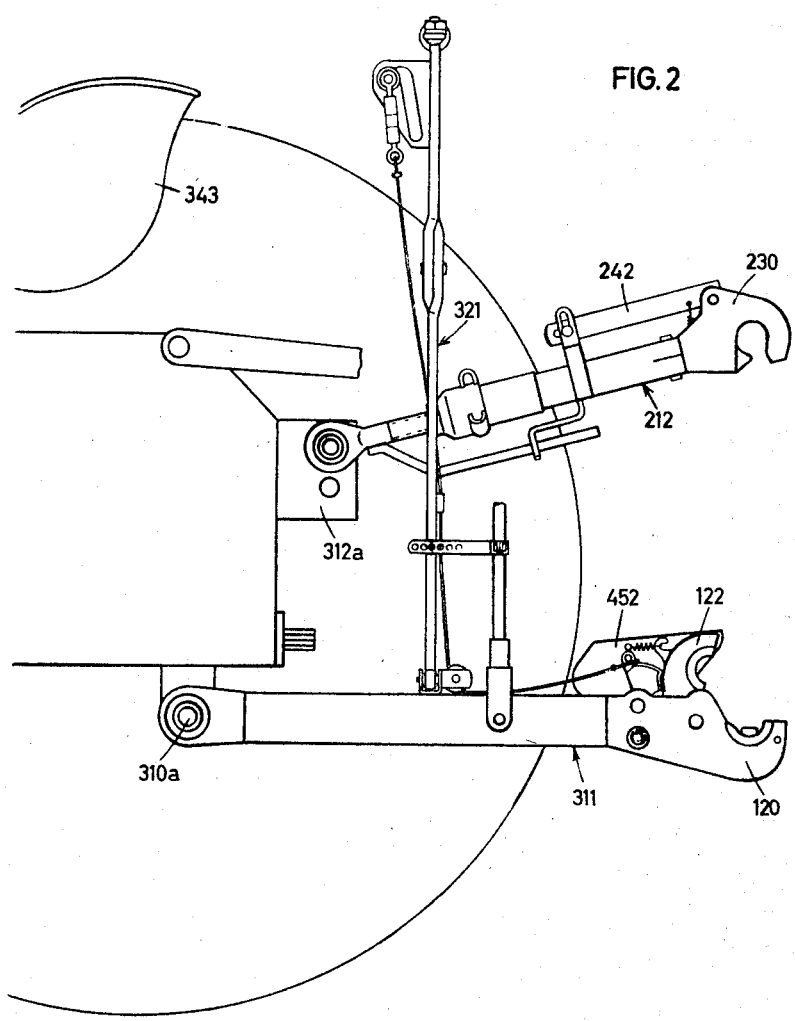

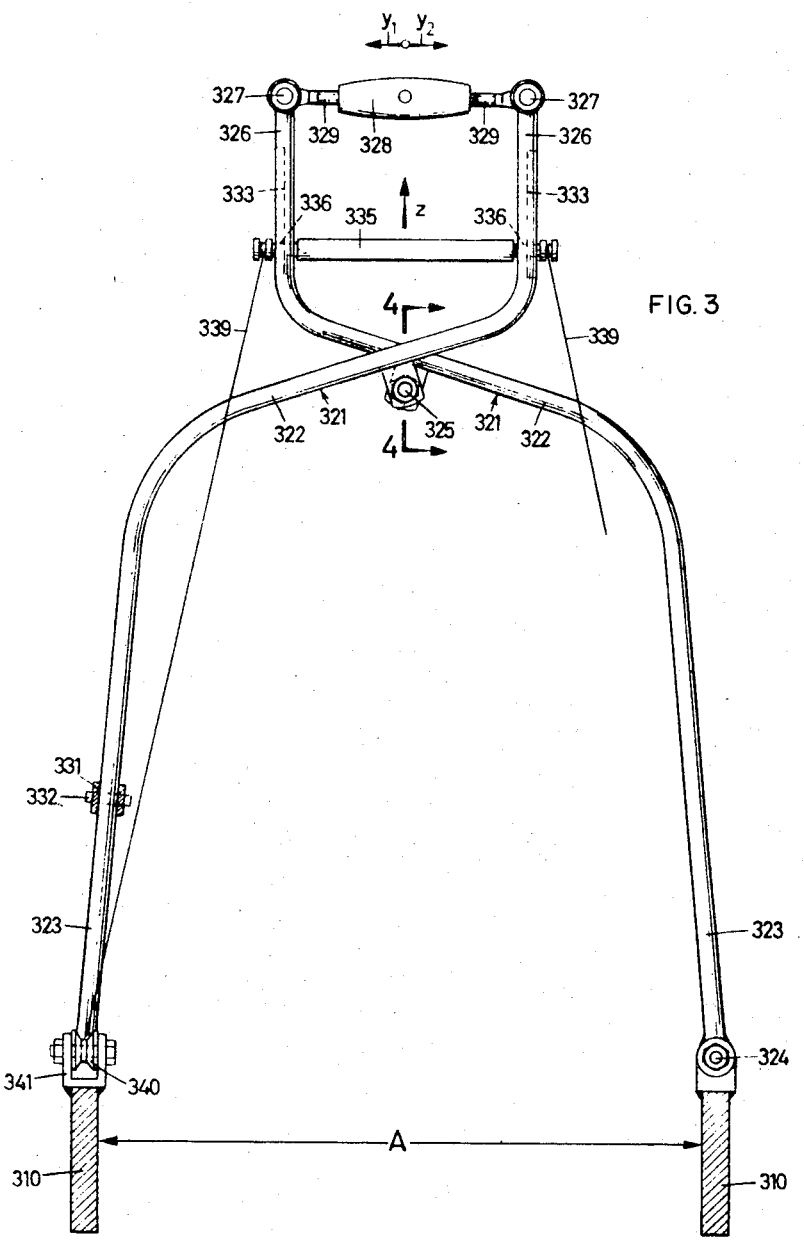

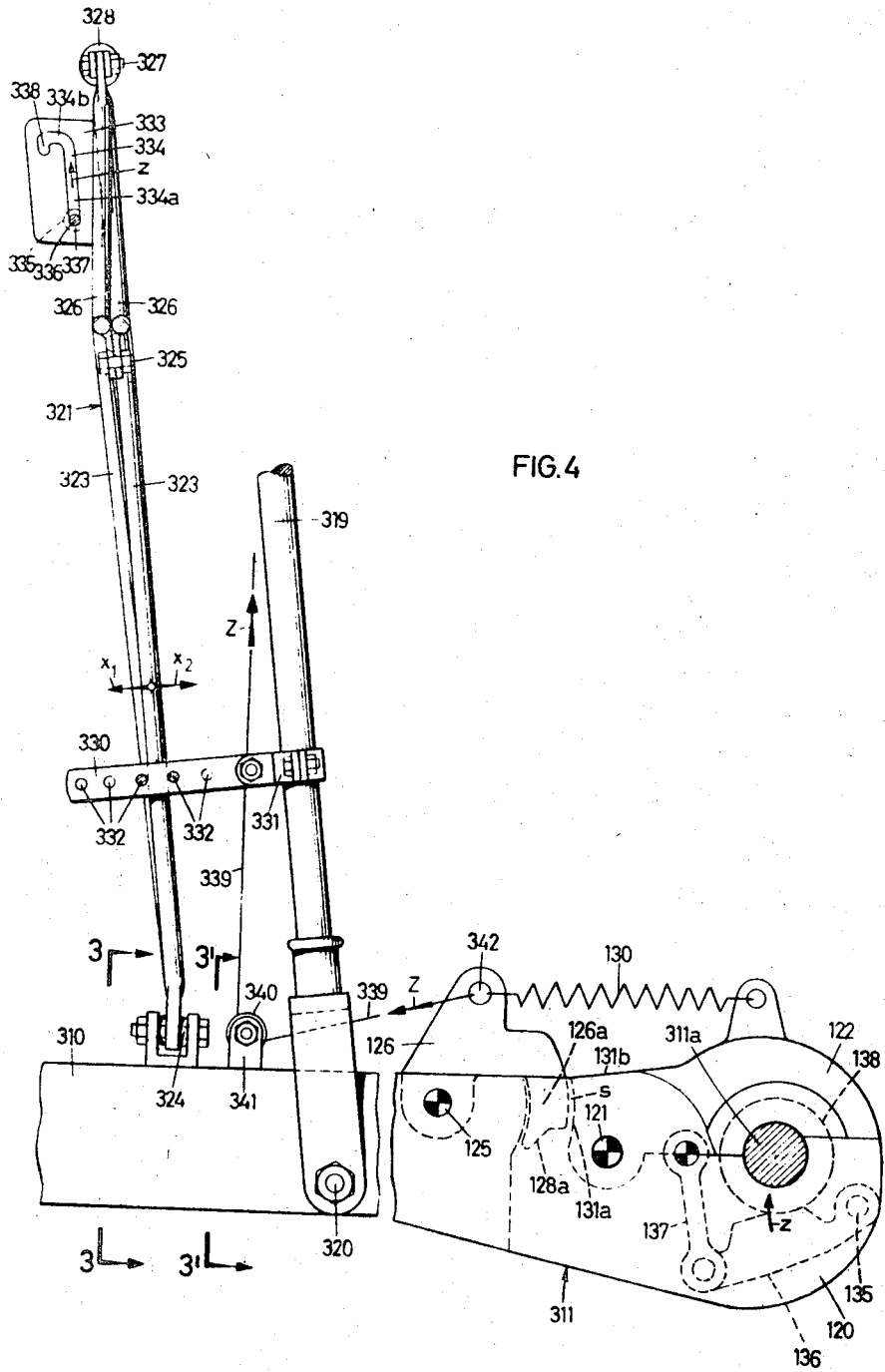

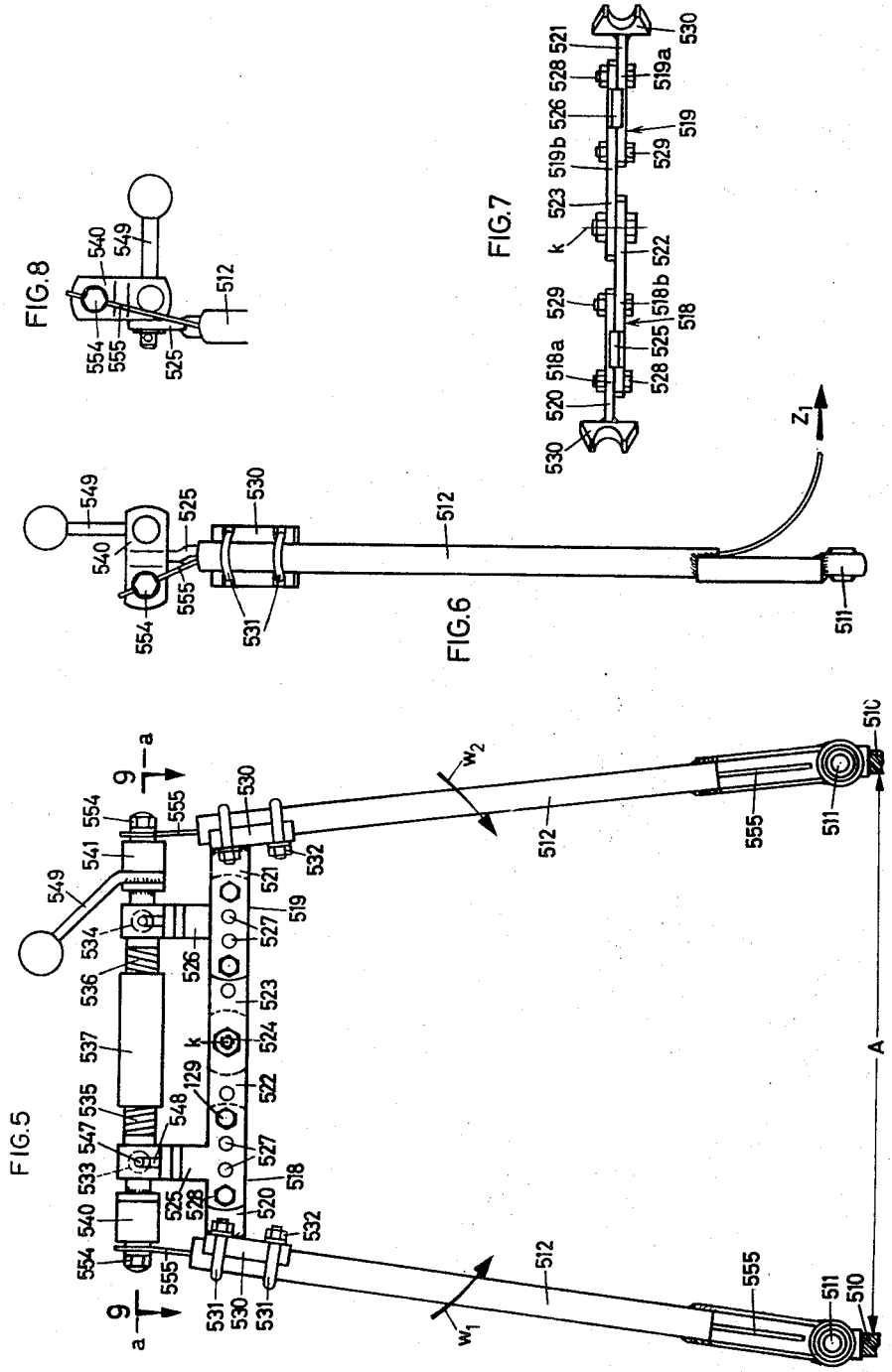

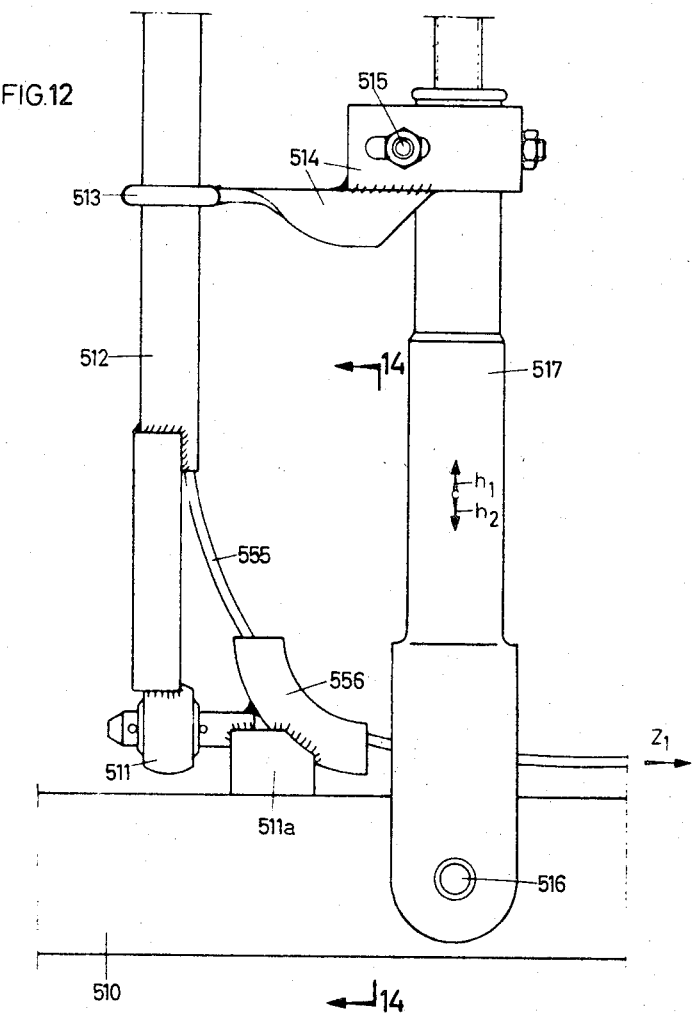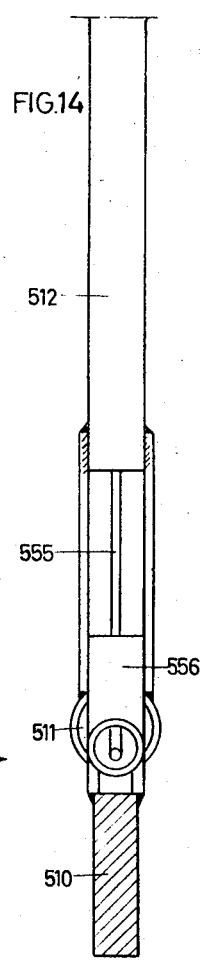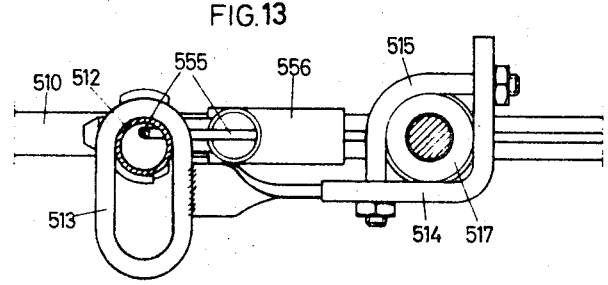

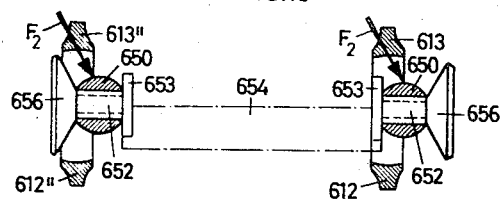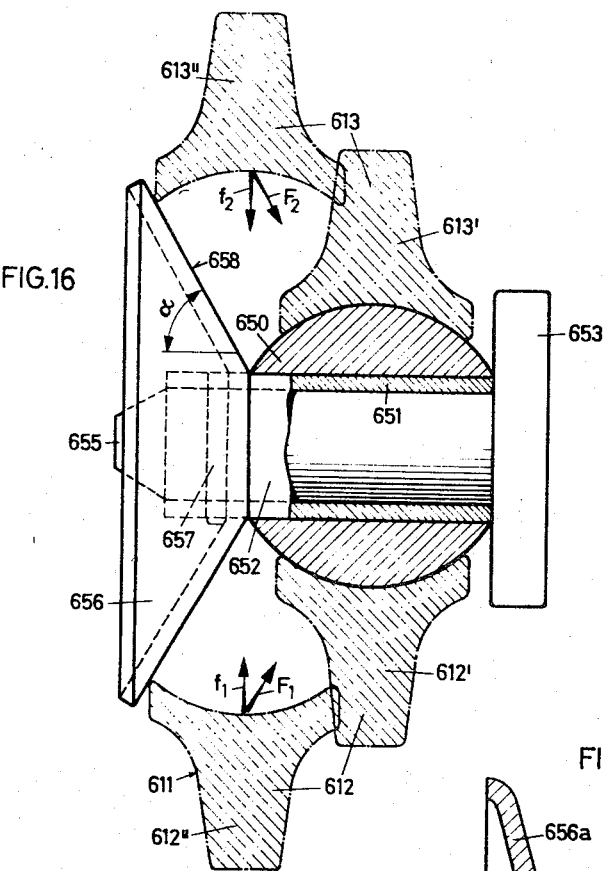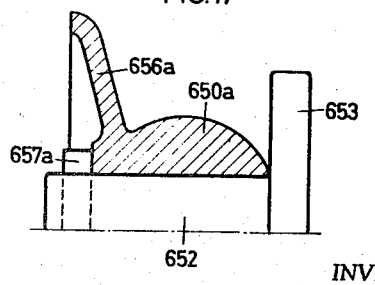

3,420,550
REMOTELY CONTROLLED COUPLING MEANS
Willy Rau, Kirchheim (Teck), Germany, assignor to Maschinenfabrik Rau oHG., Kirchheim (Teck), Germany
Filed July 18, 1966, Ser. No. 566,127
Claims priority, application Germany, Aug. 19, 1965, M 66,376; Oct. 22, 1965, M 67,015; Dec. 15, 1965, M 67,636
U.S. Cl. 280—461      16 Claims
Int. Cl. A01b 59/043; A01b 63/02; B60d 1/04

ABSTRACT OF THE DISCLOSURE

Coupling means for coupling an implement to a tractor having a driver's seat and including a three-point linkage with two lower draw bars linked at one of the ends thereof to the tractor and having coupling devices at the free ends thereof for respectively receiving towing members of the implement to be towed, means for adjusting the means for operating the coupling devices, both of said means being arranged to be operated from the driver's seat.

---

The invention relates to remotely controlled coupling means suitable, for example, for the attachment of agricultural implements to a tractor.

To achieve a rapid coupling of the drawbars of a towing linkage, such as the lower drawbars of a three-point linkage, it is necessary to bring the free ends of the drawbars into alignment with the appropriate coupling members (e.g. trunnions or ball joints) on the agricultural implement accurately and quickly.

An object of the present invention is to faciliate rapid and convenient coupling by remote control of agricultural implements to the three-point linkage of the tractor from an operator's position, such as the driver's seat.

According to the invention there is provided remotely controlled coupling means for the attachment of a towing linkage to an object to be towed wherein the linkage includes two drawbars having respective coupling devices at their free ends for receiving respective towing members of the object to be towed and wherein means are provided for adjusting the distance between said free ends of the drawbars remotely from an operator's position.

In a three-point towing linkage each of the three drawbars may be provided with coupling means for receiving a trunnion or joint member of the implement or other object to be towed.

Preferably means are provided for operating remotely from the operator's position the coupling devices of the drawbars to lock the towing members of the object in engagement with said coupling devices.

By means of the invention automatic or semi-automatic coupling of objects to be towed may be achieved, control being exercised from the driver's seat, in the case of a tractor.

In one embodiment of the invention a scissor linkage constitutes said means for adjusting the distance between the free ends of the drawbars. This consists, for example, of two crossed shear legs pivoted together at their intersection, each of their lower ends being connected to a respective drawbar of the three-point linkage and their upper ends being connected to manually operable means for adjusting the distance between said upper ends. A convenient form of operating handle is a screw-threaded member having respective right- and left-hand threads connected to respective upper ends of the shear legs. In order to position the shear legs in the fore-and-aft direction, they may conveniently be carried by lifting rods associated with the jacking system for elevating the drawbars, and they are preferably adjustable, so as to fit different designs of towing linkage, in the fore-and-aft direction.

Preferably the means for operating the coupling devices remotely includes a transverse member carried in bearings or recesses adjacent the upper ends of the shear legs, said member being formed like a handle, e.g. bar-shaped, and, by means of tension members, such as cables connected to the ends of the transverse member, is connected with movable parts of the coupling devices on the drawbars, preferably constituted by releasable and upward pivoting half socket members.

In one embodiment of the invention respective manually operable members for operating the distance adjustment means and the means for operating the coupling devices are combined in a single structural unit arranged next to or coaxially with each other. Preferably the two manually operable members are mounted coaxially for rotation about an axis transverse to the towing direction, the member for operating the coupling devices being mounted within the member for operating the distance adjustment means.

An advantageous arrangement is one in which a lever acting as the operating member for the coupling device is arranged on a transverse shaft, which extends through a rotatable sleeve, which, for example, moves a linkage for adjusting the distance between the lower link rods by means of adjusting members with right- and left-hand threads, and the ends of which shaft project from the sleeve and carry lever arms for actuating rods or tension members, such as cables, for remote control of the coupling devices.

In an alternative embodiment the means for adjusting the distance between said free ends of the drawbars comprises a pair of angle levers pivotally connected to each other and having respective first lever arms which are connected to respective adjusting members transversely displaceable by means of a manually operable member and respective second lever arms connected to respective distance setting arms which are pivotally connected to respective drawbars for effecting the distance adjustment.

The manually operable member for operating the coupling devices preferably comprises two coaxial shafts which are telescoped one within the other but secured against relative rotation, the shafts being rotatable to actuate the coupling devices by means of a lever arm mounted thereon, and each shaft being connected for movement axially with a respective transversely displaceable adjusting member.

Owing to the rotary actuation of the operating members, more particularly the coaxial arrangement thereof, and also to the articulation of the angle levers constituting the operating linkage, the space requirements for this embodiment in the vertical direction can be kept very low. Because the traction means for actuating the coupling devices are positively connected to one another in the direction of actuation by the said shafts, uneven actuation of the coupling device is avoided. Thus the coupling of an agricultural implement to a tractor can be carried out quickly and easily with simultaneous operation of the hydraulic jacking system for elevating the drawbars, and even relatively great misalignment of the tractor and agricultural implement will not prevent coupling being effected.

According to a further feature of the invention the linkage provided between the operating members and the drawbars is adjustable both horizontally and vertically to accommodate different arrangements of towing members on objects to be towed.

It is advantageous if said distance setting arms are of tubular construction and the cables for the remote control of the coupling devices are guided through the hollow interiors of said setting arms. The cables are thereby protected from damage and permit of an even more compact design.

There is a certain amount of difficulty involved in accurately positioning an object to be towed so that the towing linkage can be engaged therewith. According to a further feature of the invention, therefore, the towing members of the object to be towed comprise trunnions provided with laterally inclined faces which serve to guide the coupling devices laterally into correct engagement with the towing members.

Said trunnions are preferably provided with said inclined faces on their outwardly disposed sides, said faces being inclined inwardly. The inclined faces may be formed by respective conical or frusto-conical plates which are suitably connected to the trunnions: thus, for example, a respective ball member may be provided on each trunnion and disposed between a collar member and said inclined face. Alternatively the ball members may be formed integrally with the respective inclined faces. The fact that the inclined surfaces are formed by plates has inter alia the advantage that they are more simply manufactured than rotary parts while during assembly it is not necessary to maintain a certain rotary position for the plates since whatever their rotary position they fulfill their function equally efficiently.

Further details of the invention will be made clear in the course of the following description, given by way of example only, with reference to the accompanying drawings, in which:

FIGURE 2 is a side elevation of the embodiment of FIGURE 1;

Figure 1:
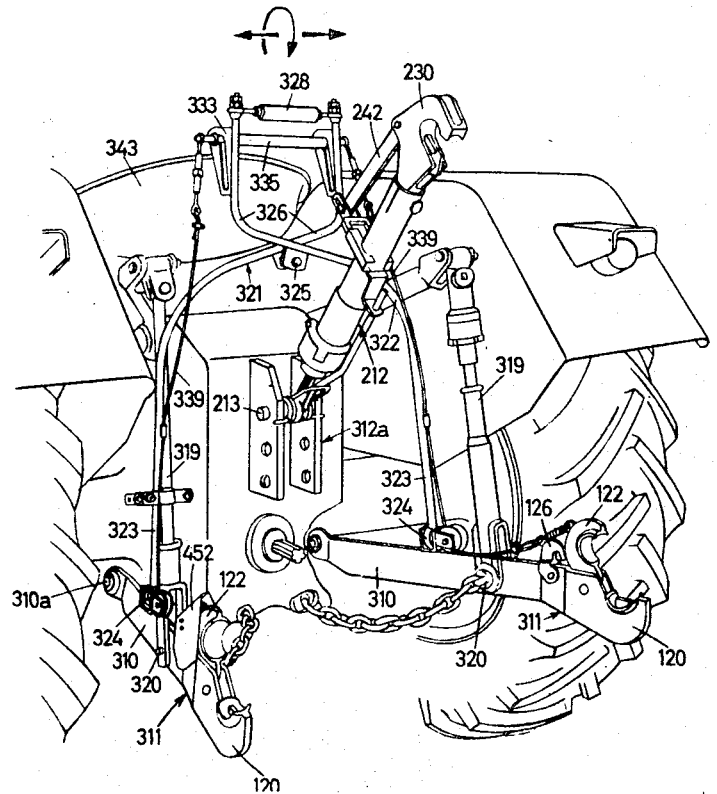
FIGURE 1 is a perspective view of coupling means according to one embodiment of the invention.
Figure 9:
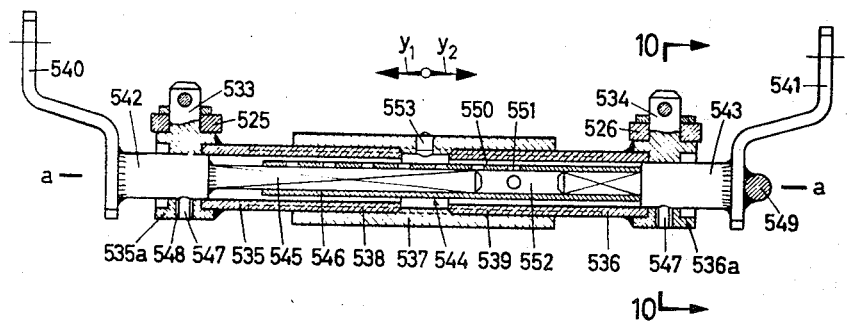
Figure 10:
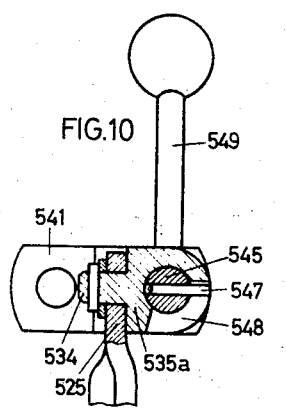
Figure 11:
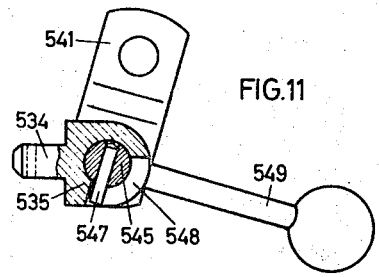

FIGURE 3 is a plan view of part of the embodiment of FIGURES 1 and 2 and shown partly (right) in section along line 3—3 and partly (left) in section along line 3'—3' in FIGURE 4;

FIGURE 4 is a side elevation of the part shown in FIGURE 3, partly in cross section along line 4—4 in FIGURE 3;

FIGURE 5 is a general view of another embodiment of part of coupling means according to the invention, the view corresponding to that of FIGURE 3;

FIGURE 6 is a side elevation of the part shown in FIGURE 5;

FIGURE 7 is a top view thereof;

FIGURE 8 is a fragmentary view of the part shown in FIGURE 6 but in a different operative position;

FIGURE 9 is a section on the line 9—9 of FIGURE 5;

FIGURE 10 is a section on the line 10—10 of FIGURE 9;

FIGURE 11 shows the same section as FIGURE 10 in a different operative position;

FIGURE 12 shows a detail of coupling means according to the invention;

FIGURE 13 is a top view of FIGURE 12;

FIGURE 14 is an elevation in the direction of arrow 14 of FIGURE 12;

FIGURE 15 is a general diagrammatic view of part of a further embodiment of the invention, shown in cross section;

FIGURE 16 is an enlarged view of part of FIGURE 15, and

FIGURE 17 is a sectional view corresponding to those of FIGURES 15 and 16 showing another embodiment.

In the embodiment according to FIGURES 1 to 4 a three-point linkage includes two drawbars 310 which pivot around transverse or ball joints 310a on the tractor. The drawbars 310 have coupling devices 311 at their free ends. FIGURE 4 shows one coupling device on an enlarged scale in the closed position: a towing member, comprising a trunnion 311a, on an object to be towed (not shown) is received in a socket formed between lower and upper parts 120, 122 respectively of the coupling device 311.

The drawbars 310 are movable in the vertical plane about joints 310a by lifting rods 319 which are connected with the drawbars 310 by pivot pins 320. The rods 319 can be raised or lowered by the tractor's hydraulic jacking mechanism, which forms no part of the present invention.

For the transverse adjustment of the separation between the drawbars 310, that is the distance A between the drawbars 310 in the plane of FIGURE 3, a scissors linkage 321 is provided. The linkage 321 comprises two shear legs 322 pivoted together at a joint 325, the lower arms 323 of the linkage being connected to the drawbars 310 by means of ball or other universal joints 324. The upper arms 326 of the scissors linkage are provided with joints 327 connecting them to opposite ends of an adjusting handle 328. The handle 328 is formed internally with right- and left-hand threads which engage corresponding oppositely threaded shanks 329 on which the joints 327 are mounted. To retain the scissors linkage 321 in the fore-and-aft direction, that is in the plane of FIGURE 3, one of the shear legs 322 (or both of them) is held by a retainer 330 (FIGURE 4) which is adjustably connected to one of the lifting rods 319 by means of a clamp 331. For adaptation of the linkage 321 to different coupling conditions the retainer 330 has a number of clamping positions 332 which provide for adjustment of the shear legs 322 in the direction of arrows $x_1$, $x_2$.

Slotted plates 333 are rigidly connected, e.g. by welding, to the upper arms 326 of the shear legs 322 and are each provided with a guide slot 334 interconnecting a lower recess 334a and an upper recess 334b, the slot 334 having an inverted U-shape. A bar-shaped transverse member 335 has reduced diameter ends which pass through the slots 334. The transverse member 335 can be moved in the slots 334, between the lower recess 334a, forming a first stop, and the upper recess 334b, forming a second stop.

Cables 339 are attached to the ends of the transverse member 335 outside the slots 334 and pass over respective lower guide pulleys 340 mounted in bearing blocks 341 on the drawbars 310 (FIGURE 4) to respective connection points 342 on latches 126 which form part of the coupling devices 311.

The handle 328 and transverse member 335 are situated behind the driving seat 343 of a tractor on which the coupling means is mounted (FIGURE 1) and the driver can thus operate the handle 328 and the transverse member 335 by hand without leaving the seat 343.

The operation of the coupling means will be apparent from the fore-going description. The coupling of an object, such as an agricultural implement, to be towed is effected from the driver's seat 343 as follows:

By turning the handle 328 the distance of the joints 327 can be adjusted in the diretcion of arrows $y_1$, $y_2$ and the distance A between the drawbars 319 thereby adjusted by the scissors linkage 321 to adapt the separation of the drawbars to the distance between the coupling members 311a on the agricultural implement (not shown). The upper parts 122 of the coupling devices 311 can be pivoted upwards by raising the transverse member 335 in the direction of arrow z (FIGURE 4) and resting its ends in the upper recesses 338 of the plates 333, so that the cables 339 exert a tension (Z, FIGURE 4) on the latches 126 which release the coupling devices 311. The tractor may now be driven up to the implement until, with the drawbars 310 slightly lowered by means of the hydraulic jacking system, the coupling members 311a lie above the lower parts 120 of the coupling devices 311. The drawbars 310 are then raised by the lifting rods 319 so that the coupling members 311a are received in the lower parts 120 of the coupling devices 311. As soon as the coupling members 311a enter the lower parts 312 pivoted links 136, 137 disposed at the mouths of the socket act to pivot the upper parts 122 of the socket downwards against the effect of springs 130. Springs 130 thereby are tensioned. If the ends of the transverse member 335 are now lifted from the upper recesses 338 and allowed to drop down to the lower recesses 337, the tensioned springs 130 cause the latches 126 to rock about pivots 125 and enter recesses 128a formed in the lower parts 120 in front of the upper parts 122 and thus securing the upper parts 122 against upward pivoting movement. The coupling devices 311 are then locked in the closed positions.

After the drawbars 310 are coupled, a third upper drawbar 212 may also be coupled with the agricultural implement from the driving seat 343, for which purpose a further remotely controlled coupling may also be provided, allowing rapid lengthwise adjustment of the upper drawbar 212 to be made from the driving seat 343.

When the agricultural implement is to be uncoupled from the tractor, it is advisable first to uncouple the upper drawbar 212 from the implement. The latches 126 are then released by pulling the transverse member 335 in the direction of arrow z thereby withdrawing the latches 126 from the recesses 128a and, at the same time, tensioning springs 130. The drawbars 310 are then lowered by means of the lifting rods 319 so that the lower parts 120 are released from the coupling members 311a. The links 136, 137 are thus released and the upper parts 122 rocked upwardly about pivots 121 under the tension of the springs 130, opening the coupling devices 311 and enabling the agricultural implement to be released.

In the embodiment of FIGURES 5 to 14 tubular setting arms 512 are provided for adjusting the distance A between two drawbars 510 of a towing linkage in a manner to be described. The lower ends of the setting arms 512 are connected by ball joints 511 to the drawbars 510. The drawbars 510, and the upper drawbars (not shown) may be designed according to the earlier described embodiment.

In order to secure the setting arms 512 against tilting in the longitudinal direction (i.e. the direction of towing), one (or both) of them is retained by a loop-shaped holder 513 (FIGURES 12 and 13), which by means of a bracket 514 and a counter-bracket 515 equipped with nuts is clamped to one of the lifting rods 517. The lifting rods 517 are articulated at 516 to the drawbars 510 and are displaceable in the vertical direction $h_1$, $h_2$ by the hydraulic jacking system of the tractor, as in the previous embodiment.

The setting arms 512 are connected at their upper ends to outwardly extending lever arms 520, 521 of respective angle levers 518, 519. The angle levers 518, 519 have arms 522 and 523 which are pivotally interconnected at a hinge joint 524 having a swivel axis K parallel to the towing direction. The levers 518, 519 also have upwardly directed lever arms 525, 526.

As can be seen more particularly in FIGURE 7, each of the two angle levers 518, 519 is in two parts, each consisting of the parts 518a, 518b and 519a, 519b respectively. The lever arms 520 and 521 are formed by the lever parts 518a, 519a whilst the arms 522, 523 and the upwardly directed lever arms 525, 526 are formed by the lever parts 518b, 519b. Both lever parts 518a, 518b and 519a, 519b are provided with a number of holes 527 which accommodate clamping screws 528, 529. The effective lengths of the lever arms 520, 521 can thus be varied in the transverse direction, making it possible to regulate the distance between the setting arms 512 depending on the particular construction of the tractor or the three-point towing linkage. For this purpose the outwardly extending lever arms 520, 521 are rigidly connected to flange-like connecting parts 530, which embrace the upper ends of the setting arms 512 and are firmly clamped thereto by means of brackets 531 and nuts 532. The angle levers 518, 519 therefore form a rigid unit with the respective setting arms 512. By moving the connecting parts 530 after loosening the nuts 532 the vertical position of the angle levers 518, 519 relative to the setting arms 512 can be adjusted.

The upwardly directed lever arms 525, 526 are connected to transversely displaceable adjusting members 535, 536 by link pins 533, 534, the axes of which are parallel with the articulation axis k. The adjusting members 535, 536 have external right- and left-hand screwthreads which engage corresponding internal threads in a rotary sleeve 537, so that by rotating the sleeve 537 in one direction the adjusting members 535, 536 are moved outwardly in the direction of arrows $y_1$, $y_2$ and by rotating the sleeve in the opposite direction the adjusting members 535, 536 are moved inwardly in unison.

The adjusting members 535, 536 are hollow and house within them respective rotatable members 542, 543 on which respective levers 540, 541 are fixed. The members 542, 543 are interconnected by a telescopic shaft 544. The shaft 544 comprises a shaft member 545 rigidly connected to the member 542 and a sleeve 546 rigidly connected to the bearing part 543, the sleeve 546 being secured against rotation relatively to the shaft member 545 in a suitable manner: for example the shaft member 545 and sleeve 546 may have a square cross section. Relative movement of the two parts 545 and 546 axially, however, is permitted, so that levers 540, 541 may be displaced relatively to one another in the direction of arrows $y_1$, $y_2$. The adjusting members 535, 536 drive the members 542, 543 by way of pins 547 extending into apertures in connecting parts 535a, 536a which are integral with the members 535, 536 respectively. Rotation of the members 542, 543 and therefore of the levers 540, 541 about the axis a—a is, as shown in FIGURES 10 and 11, limited by the extent of arcuate slots 548 in the parts 535a, 536a in which the pins 547 can move on rotation of the shaft 544 about axis a—a. To operate the levers 540 and 541 by rotation of the shaft 544 a handle 549 is secured, e.g. by welding, to the lever 541.

The shaft 544 has an external diameter which is smaller than the internal diameter of the adjusting members 535 and 536 and the annular space 550 between them, in addition to the interior 552 of the sleeve 546, is filled with lubricant, bores 551 in the sleeve 546 providing communication with the space 550. The lubricant, in this case lubricating oil, is introduced through a lubricating nipple 553 in the sleeve 537.

A cable 555 is secured to the ends of the levers 540, 541 by screws and nuts 554. The cable 555 is guided downwards through the interiors of the two tubular setting arms 512 and at the lower end of each setting arm 512 the cable 555 passes through a tubular guide bearing 556 (FIGURE 12) welded to a bearing block for the respective ball joint 511.

The manner of operation of the coupling means of FIGURES 5 to 14 is as follows:

If an object such as an agricultural implement is to be coupled to the tractor, the latter is driven backwards up to the implement so that the coupling devices on the drawbars 510 come to bear below the towing members on the implement. The coupling devices are unlatched and opened by rotation of the lever 549 from the position shown in FIGURE 6 to that shown in FIGURE 8, this movement tensioning the cable 555 and releasing a latch in a similar manner to the embodiment of FIGURES 1 to 4.

If the distance A between the two drawbars 510 does not correspond to the distance between the towing members on the implement, adjustment of the distance A is effected by rotating the sleeve 537. Thus, if the sleeve 537 is rotated so that the distance between the two link pins 533, 534 is increased, the adjusting members 535, 536 being moved in the direction of arrows $y_1$, $y_2$, the angle levers 518, 519 are swung about their common fulcrum 524 in the direction of arrows $w_1$, $w_2$ (FIGURE 5) and the two drawbars 510 move closer to each other. As soon as the distance A between the lower link rods 510 agrees with that between the towing members on the implement, the elevating rods 517 and hence the free ends of the drawbars 510 are raised by the hydraulic system of the tractor until the open coupling devices come into engagement with the towing members. In so doing the coupling devices are automatically closed, as in the embodiment of FIGURES 1 to 4. A force Z is exterted on the cables 555, by the action of the springs in the coupling devices, and the levers 540, 541 together with the handle 549 are swung from the position shown in FIGURE 8 into the position shown in FIGURE 6.

The upper drawbar (not shown) of the three-point towing linkage is finally brought into engagement with the implement, all the operations having been carried out unaided from the driver's seat of the tractor.

For uncoupling the implement from the tractor, the upper drawbar is first uncoupled. Thereupon by swinging the handle 549 from the position shown in FIGURE 10 to that shown in FIGURE 11, the coupling devices at the free ends of the drawbars 510 are unlocked and the associated springs tensioned. The drawbars 510 are then lowered by means of the lifting rods 517. As in the previously described embodiment (FIGURE 4) the coupling devices open automatically under the action of the tensioned springs when the drawbars 510 are lifted clear.

FIGURES 15 to 17 show preferred arrangements of a coupling device and towing member. The coupling device 611 has a fixed lower portion 612, as previously described, rigidly connected to a drawbar of a three-point towing linkage and an articulated upper portion 613 pivoted to the drawbar for rotation relative to the lower portion 612 about a horizontal shaft. When the coupling 611 is in a closed position 612' or 613' (FIGURE 16), it fits closely about the ball member 650 mounted on a trunnion 652 which forms the towing member of the implement to be towed.

In the embodiment shown in FIGURES 15 to 17, the ball member 650 is fitted onto the trunnion 652 by means of an intermediate sleeve 651, the trunnion 652 being rigidly attached to a part 653 of the implement. A conical plate 656 is mounted on the end 655 of the trunnion 652 and is secured to the trunnion by any suitable means, such as a dowel pin 657.

When the implement is to be attached to the tractor, the latter backs towards the implement with the coupling 611 open. If the lower and upper portions 612, 613 respectively are relatively misaligned with respect to the ball member 650 as shown in positions 612″ and 613″ in FIGURES 1 and 2, the misalignment is removed automatically as the coupling closes, in the directions of arrows $f_1$, $f_2$. As soon as the outer edges of the portions 612, 613 touch the conical plate 656, they slide on the inclined face 658 of the conical plate 656 in the direction of arrows $F_1$ and $F_2$, and while turning or moving the implement to one side are brought close enough to the ball member 650 to effect an easy, automatic engagement therewith.

FIGURE 17 illustrates an alternative arrangement in which the ball member 650a and conical plate 656a are integral. They are secured against axial movement on the trunnion 652 by means of a dowel pin 657a or, for example, by a threaded connection.

The inclined face 658 of the conical plate 656 may form any desired angle with the axis of the trunnion 652 but this angle is preferably between 50° and 70°.

The apex of the cone on which the face 658 lies is preferably near the centre of the ball member 650 so that when coupling is effected, the function of the cone commences at a smaller or larger lateral displacement, that is, the portions 612, 613 of the coupling device 611 are brought by the plate 656 virtually into engagement with the ball member 650.

It will be appreciated that coupling means according to the invention can be used with any convenient form of towing member if the coupling devices are suitably adapted.

I claim:

1. In combination with a towing vehicle having a drivers seat, coupling means for coupling an object to be towed to said vehicle, said coupling means comprising at least two draw bars projecting substantially in towing direction from said vehicle and being each linked at one end thereof to the vehicle for universal tilting movement with respect thereto; a coupling device connected to the other end of each draw bar for receiving respectively towing members of an object to be towed by the vehicle; a linkage including a pair of elongated substantially upright members respectively pivotally connected at the lower end thereof to said draw bars intermediate the ends of the latter and extending with the upper end thereof in the proximity of said drivers seat; means for articulatedly connecting said pair of members intermediate the ends thereof to each other; and manually operable adjusting means connected to the upper ends of said elongated members for adjusting the distance therebetween and to thereby adjust the spacing between said coupling devices.

2. Coupling means as claimed in claim 1 and including means for actuating said coupling devices, operating means at the upper ends of said elongated members, and means connecting said operating means to said actuating means.

3. Coupling means as claimed in claim 2, wherein said manually operable means comprises two members mounted for rotation about a common axis transverse to said towing direction and wherein said operating means is mounted turnable about said common axis.

4. Coupling means as claimed in claim 3 wherein transversely displaceable distance adjusting members are accommodated in the interior of the member operating the distance adjustment means of the drawbars and a transverse shaft forms parts of the member operating the coupling devices, said shaft traversing the interior of the first-mentioned member, said interior forming a sealed lubricant chamber.

5. Coupling means as claimed in claim 1, wherein said lingage means is in the form of a scissor linkage in which said elongated members cross each other intermediate the ends thereof and are pivotally connected at the crossing point by said articulating means so as to form two shear legs.

6. Coupling means as claimed in claim 5 wherein said manually operable means comprises a screw-threaded member having respective right- and left-hand threads connected to the respective upper ends of the shear legs.

7. Coupling means as claimed in claim 5 wherein the shear legs are articulated to the drawbars and at least one adjustable guide is provided for restraining the shear legs against movement in a direction parallel to the drawbars.

8. Coupling means as claimed in claim 3, wherein said coupling devices have respectively movable parts movable between a locked and an unlocked position, and including slot defining means on each of said shear legs, said slot defining means defining at least one lower and one upper rest in the respective slots, a handle member having opposite ends received in said slots movable between said lower and said upper rest, and means connecting said handle member to said movable parts of said coupling devices in such a manner that said coupling devices are in said locked position when said handle member is in one rest and in said unlocked position when said handle member in the other rest.

9. Coupling means as claimed in claim 8, wherein said means connecting said handle member to said movable parts or said coupling devices comprises a pair of cables and including guide pulleys for said cables mounted on said draw bars adjacent the pivotal connection of the shear legs with the draw bars.

10. Coupling means as claimed in claim 1, wherein said draw bars form part of a three-point linkage connected to said towing vehicle.

11. In a towing linkage having at least two draw bars, remotely controlled coupling means for the attachment of the towing linkage to an object to be towed, said coupling means including two draw bars comprising respectively coupling devices at the free ends of the draw bars for receiving respective towing members of the object to be towed, and remote control means for adjusting the distance between said coupling devices and including a manually operable member, adjusting members transversely displaceable by means of said manually operable member, distance setting arms respectively pivotally connected to said draw bars for effecting the distance adjustment, and a pair of angle levers pivotally connected to each other and having each a first lever arm connected to a respective one of said adjusting members and a second lever arm connected to a respective one of said distance setting arms.

12. Coupling means as claimed in claim 11 wherein each angle lever comprises two parts, one part forming the one lever arm and the other part having a pivot connection to the other angle lever, and means for adjusting the relative effective lengths of said parts.

13. Coupling means as claimed in claim 11 wherein said distance setting arms are of tubular construction and including cables for the remote control of the coupling devices guided through the interiors of said setting arms.

14. Coupling means as claimed in claim 11 wherein the manually operable member for operating the coupling devices comprises two coaxial shafts which are telescoped one within the other but secured against relative rotation, and a lever arm is provided for rotating the shafts to actuate the coupling devices, each shaft being connected for movement axially with said displaceable adjusting member.

15. Coupling means as claimed in claim 14 wherein each of the shafts has limited freedom of rotational movement, each said shaft being provided with a respective pin and each respective adjusting member having a peripheral slot therein in which the respective pin moves, the slot limiting arcuate movement of the pin.

16. Coupling means as claimed in claim 11 including a device for securing the distance setting arms against tilting in the longitudinal direction of a vehicle on which the coupling means is mounted, said vehicle having elevating rods for raising and lowering the drawbars and the said device comprising at least one loop-shaped retaining member fixed to one of the elevating rods and provided with a slot extending in a direction transverse to the towing direction.

References Cited

UNITED STATES PATENTS

| | | | |
|---|---|---|---|
| 2,912,257 | 11/1959 | Du Shane | 280—460 |
| 3,220,751 | 11/1965 | Tweedale | 280—461 |
| 3,312,478 | 4/1967 | Knaapi | 280—479 XR |

BENJAMIN HERSH, *Primary Examiner.*

MILTON L. SMITH, *Assistant Examiner.*

U.S. Cl. X.R.

172—450; 280—460